(12) United States Patent
Kaseya

(10) Patent No.: US 8,530,822 B2
(45) Date of Patent: *Sep. 10, 2013

(54) ILLUMINATION DEVICE AND PROJECTION HAVING A PLURALITY OF COLLIMATING AND CONVERGING LENSES

(75) Inventor: Hiroyasu Kaseya, Suwa (JP)

(73) Assignee: Seiko Epson Corporation (JP)

( * ) Notice: Subject to any disclaimer, the term of this patent is extended or adjusted under 35 U.S.C. 154(b) by 306 days.

This patent is subject to a terminal disclaimer.

(21) Appl. No.: 12/897,108

(22) Filed: Oct. 4, 2010

(65) Prior Publication Data

US 2011/0116052 A1     May 19, 2011

(30) Foreign Application Priority Data

Nov. 17, 2009  (JP) ................................ 2009-261731

(51) Int. Cl.
*H01J 3/14* (2006.01)
(52) U.S. Cl.
USPC .......................................... 250/216; 353/34
(58) Field of Classification Search
USPC ..... 353/30–34, 48, 49, 94–99, 119; 250/216, 250/208.1, 226, 239; 362/14, 19, 268, 244–246; 359/618–623
See application file for complete search history.

(56) References Cited

U.S. PATENT DOCUMENTS

| | | | |
|---|---|---|---|
| 5,237,367 A | 8/1993 | Kudo | |
| 6,414,795 B1 | 7/2002 | Sugawara | |
| 6,547,421 B2 * | 4/2003 | Sugano | 362/268 |
| 6,577,429 B1 | 6/2003 | Kurtz et al. | |
| 7,136,035 B2 | 11/2006 | Yoshida | |
| 7,537,347 B2 | 5/2009 | Dewald | |
| 7,575,328 B2 | 8/2009 | Inoko | |
| 2001/0048560 A1 | 12/2001 | Sugano | |
| 2004/0196443 A1 | 10/2004 | Tomita et al. | |
| 2009/0040753 A1 | 2/2009 | Matsumoto et al. | |
| 2011/0116053 A1 * | 5/2011 | Kaseya | 353/34 |

FOREIGN PATENT DOCUMENTS

| | | |
|---|---|---|
| EP | 0 985 952 | 3/2000 |
| JP | 06-265881 | 9/1994 |
| JP | 2001-343706 A | 12/2001 |
| JP | 2004-341107 A | 12/2004 |
| JP | 2006-332077 A | 12/2006 |
| JP | 2009-042637 | 2/2009 |
| WO | 99-49358 | 9/1999 |

* cited by examiner

*Primary Examiner* — Que T Le
(74) *Attorney, Agent, or Firm* — Harness, Dickey & Pierce, P.L.C.

(57) ABSTRACT

An illumination device includes: a light source which has an emission surface forming area where a plurality of emission surfaces are disposed; a plurality of converging lenses disposed in correspondence with the plural emission surfaces to converge emission lights emitted from the emission surfaces; a first fly-eye lens which divides lights converged by the plural converging lenses into a plurality of partial lights; a second fly-eye lens which converges the plural partial lights; and a condenser lens which stacks the plural partial lights converged by the second fly-eye lens on an illumination receiving area, wherein the plural converging lenses stack the emission lights on the first fly-eye lens.

6 Claims, 12 Drawing Sheets

ILLUMINATION DEVICE AND PROJECTION HAVING A PLURALITY OF COLLIMATING AND CONVERGING LENSES

BACKGROUND

1. Technical Field

The present invention relates to an illumination device and a projector.

2. Related Art

Recently, a projector which includes an illumination device provided with a solid light source such as a semiconductor laser, a super luminescent diode (SLD), and a light emitting diode (LED) has been developed or commercialized as a product. The solid light source is small and lightweight, and has considerably high light emission luminance as a result of recent development. Thus, the solid light source is suited for a light source of an illumination device. For example, WO99/49358 discloses a light source of an illumination device which includes a plurality of semiconductor lasers disposed in the form of two-dimensional arrays. This structure allows the illumination device to produce high output.

According to the illumination device having the plural semiconductor lasers, however, the light source is constituted only by a collection of point light sources. In this case, unevenness of illuminance is produced on an illumination receiving area even when uniform illumination on the illumination receiving area is desired. For overcoming this drawback, the illumination device of this type requires an additional optical system for reducing illuminance unevenness of illumination light in some cases. For example, JP-A-2009-42637 discloses a technology of an illumination device having plural laser beam sources, the device reduces illuminance unevenness of illumination light on the illumination receiving area by shifting laser beam entrance areas for entering a fly-eye lens such that intensity patterns of lights stacked on the illumination receiving area can be increased.

SUMMARY

An advantage of some aspects of the invention is to provide an illumination device which can reduce illuminance unevenness of illumination light.

According to an aspect of the invention, there is provided an illumination device including: a light source which has an emission surface forming area where a plurality of emission surfaces are disposed; a plurality of converging lenses disposed in correspondence with the plural emission surfaces to converge emission lights emitted from the emission surfaces; a first fly-eye lens which divides lights converged by the plural converging lenses into a plurality of partial lights; a second fly-eye lens which converges the plural partial lights; and a condenser lens which stacks the plural partial lights converged by the second fly-eye lens on an illumination receiving area. The plural converging lenses stack the emission lights on the first fly-eye lens.

According to this illumination device, the emission lights can be supplied to and stacked on the first fly-eye lens by the function of the converging lenses. Thus, illuminance unevenness of illumination light can be reduced.

According to the illumination device of the above aspect, the emission lights enter entrance surfaces of the converging lenses, the position of the optical axis of each of the emission lights on the entrance surfaces is determined such that the distance between the optical axis and the center of the corresponding entrance surface increases as the distance between the center of the emission surface forming area and the corresponding emission surface becomes longer, and concerning the emission surface shifted from the center of the emission surface forming area in a predetermined direction, the position of the optical axis of the emission light emitted from the corresponding emission surface on the entrance surface is shifted from the center of the entrance surface in the predetermined direction.

According to this illumination device, the emission lights can be supplied to and stacked on the first fly-eye lens by the function of the converging lenses. Thus, illuminance unevenness of illumination light can be reduced.

According to the illumination device of the above aspect, the number of the emission surface forming area may be plural, and the plural converging lenses may stack the emission lights on the first fly-eye lens for each of the emission surface forming areas.

According to this illumination device, the incident angles of the lights entering the first fly-eye lens can be decreased. Thus, the efficiency of using light can improve.

The illumination device of the above aspects may further include a plurality of collimating lenses disposed in correspondence with the plural emission surfaces to convert the emission lights into collimated lights on the optical path between the light source and the converging lenses.

According to this illumination device, the efficiency of using light can improve.

According to another aspect of the invention, there is provided an illumination device including: a light source which has an emission surface forming area where a plurality of emission surfaces are disposed; a plurality of collimating lenses disposed in correspondence with the plural emission surfaces to convert the emission lights emitted from the emission surface into collimated lights; a plurality of converging lenses disposed in correspondence with the plural collimating lenses to converge the collimated lights; a first fly-eye lens which divides lights converged by the plural converging lenses into a plurality of partial lights; a second fly-eye lens which converges the plural partial lights; and a condenser lens which stacks the plural partial lights converged by the second fly-eye lens. The plural collimating lenses and the plural converging lenses stack the emission lights on the first fly-eye lens.

According to this illumination device, the emission lights can be supplied to and stacked on the first fly-eye lens by the functions of the collimating lenses and the converging lenses. Thus, illuminance unevenness of illumination light can be reduced.

According to the illumination device of the above aspect, the emission lights enter entrance surfaces of the collimating lenses, the position of the optical axis of each of the emission lights on the entrance surfaces is determined such that the distance between the optical axis and the center of the corresponding entrance surface increases as the distance between the center of the emission surface forming area and the corresponding emission surface becomes longer, and concerning the emission surface shifted from the center of the emission surface forming area in a predetermined direction, the position of the optical axis of the emission light emitted from the corresponding emission surface on the entrance surface is shifted from the center of the entrance surface in the predetermined direction.

According to this illumination device, the emission lights can be supplied to and stacked on the first fly-eye lens by the functions of the collimating lenses and the converging lenses. Thus, illuminance unevenness of illumination light can be reduced.

The illumination device of the above aspect may further include a field lens disposed on an optical path between the converging lenses and the first fly-eye lens to converge lights received from the converging lenses.

According to this illumination device, the efficiency of using light can improve.

According to the illumination device of the above aspect, the plural converging lenses may be formed integrally with each other.

According to this illumination device, the plural converging lenses can be formed by a simple process.

According to the illumination device of the above aspect, the light source may be a semiconductor laser, a super luminescent diode, or a light emitting diode.

According to this illumination device, luminance of the light source increases.

According to still another aspect of the invention, there is provided a projector including: the illumination device of the above aspect of the invention; a light modulation device which modulates light received from the illumination device according to image information; and a projection device which projects an image formed by the light modulation device.

This projector includes the illumination device which can reduce illuminance unevenness. Thus, the projector can project images having less illuminance unevenness.

BRIEF DESCRIPTION OF THE DRAWINGS

The invention will be described with reference to the accompanying drawings, wherein like numbers reference like elements.

DESCRIPTION OF EXEMPLARY EMBODIMENTS

Preferred embodiments according to the invention are hereinafter described with reference to the drawings.

1. First Embodiment 1.1 Illumination Device in First Embodiment

Figure 1:
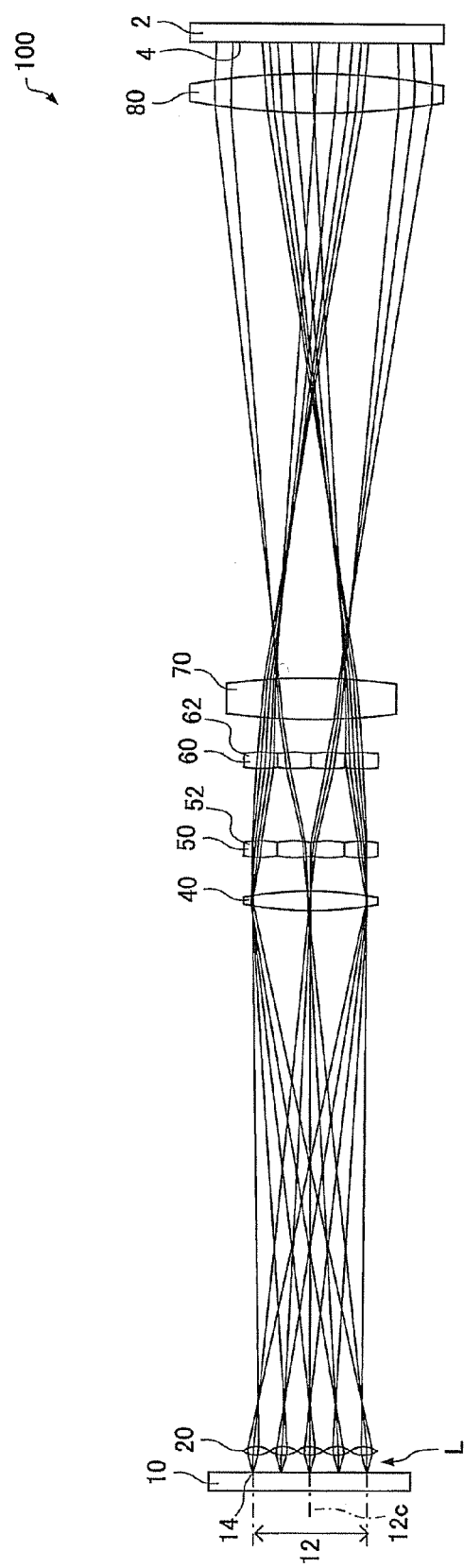
FIG. 1 schematically illustrates an illumination device according to a first embodiment.
Figure 2:
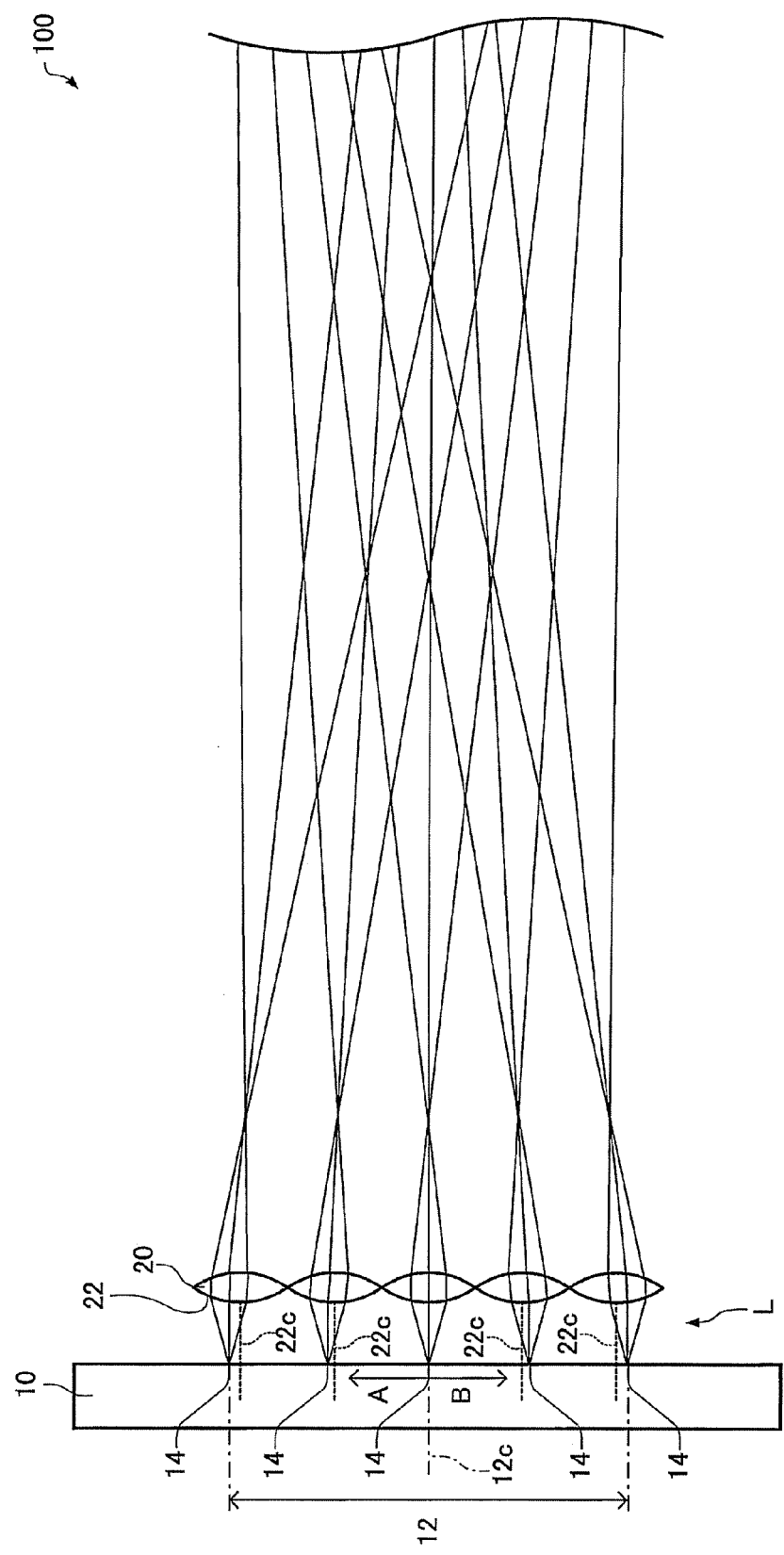
FIG. 2 schematically illustrates the illumination device according to the first embodiment.

An illumination device 100 according to a first embodiment is now explained. FIG. 1 schematically illustrates the illumination device 100. FIG. 2 illustrates an enlarged part of the illumination device 100 shown in FIG. 1. In this embodiment, the illumination device 100 applied to an illumination device of a projector will be discussed.

As illustrated in FIG. 1, the illumination device 100 includes a light source 10, converging lenses 20, a first fly-eye lens 50, a second fly-eye lens 60, and a condenser lens 70. The illumination device 100 may further include a first field lens 40 and a second field lens 80.

The illumination device 100 has an optical system containing the light source 10, the converging lenses 20, the first fly-eye lens 50, the second fly-eye lens 60, and the condenser lens 70 to supply illumination light onto a light entrance surface 4 of a light valve 2, for example, by using these components 10 through 70. The respective components included in the illumination device 100 are now explained one by one.

The light source 10 is constituted by a solid light source such as a semiconductor laser, a super luminescent diode (SLD), and a light emitting diode (LED), for example. This structure allows the light source 10 to provide high luminance. The light source 10 may have a plurality of emission surfaces 14. Though not shown in the figure, the emission surfaces 14 may be side surfaces of active layers sandwiched between clad layers when the light source 10 includes end surface light emission type light emission elements, for example. The plural emission surfaces 14 of the light source 10 may be produced by disposing a plurality of light emission elements (such as SLD elements) on a supporting substrate, for example. While the light source 10 has the five emission surfaces 14 in the example shown in the figure, the number of the emission surfaces 14 is not specifically limited. The emission surfaces 14 are disposed on an emission surface forming area 12. While one row of the emission surfaces 14 is provided on the emission surface forming area 12 in the example shown in the figure, plural rows of the emission surfaces 14 may be equipped. The emission surface forming area 12 may be defined as an area located between the emission surface positioned at one end of the row of the emission surfaces 14 and the emission surface positioned at the other end, for example. Though not shown in the figure, the emission surface forming area 12 may be defined as an area surrounded by the emission surfaces 14 located at the outside positions of plural lines and plural rows of the emission surfaces 14, for example. The emission surface forming area 12 may be defined as an area containing the emission surfaces 14 from which lights stacked on the first fly-eye lenses 50 are supplied by the function of the converging lenses 20. As illustrated in FIG. 2, the plural emission surfaces 14 are disposed in such a manner as to be symmetric with respect to a center 12c of the emission surface forming area 12, for example. The center 12c of the emission surface forming area 12 may be the center of a line which connects the emission surface positioned at one end of the row of the emission surfaces 14 and the emission surface positioned at the other end. When the emission surface forming area 12 is rectangular, the center 12c of the emission surface forming area 12 may be a cross point of two diagonals, for example. The light source 10 may have an optical element (not shown) for guiding the lights emitted from the emission surfaces 14 toward the converging lenses 20. The light source 10 can emit emission light L from each of the plural emission surfaces 14. The emission light L is released at a predetermined radial angle. The cross-sectional shape on a plane perpendicular to the optical axis of each of the emission lights L is an elliptic shape, for example.

Each of the converging lenses 20 is an optical element which converges the emission light L. More specifically, each of the converging lenses 20 is an optical element which converges (concentrates) the emission light L, diverges the converged emission light L, and supplies the diverged emission light L onto the first fly-eye lens 50 via the first field lens 40. The plural converging lenses 20 are provided in correspondence with the plural emission surfaces 14. In the example shown in the figure, the five converging lenses 20 are provided in correspondence with the five emission surfaces 14. That is, the emission surfaces 14 and the converging lenses 20 are provided with one-to-one correspondence. The plural converging lenses 20 maybe formed integrally with each other. Thus, the plural converging lenses 20 can be formed by a simple process.

According to the illumination device 100, the emission lights L enter entrance surfaces 22 of the converging lenses 20 as illustrated in FIG. 2. The position of the optical axis of each of the emission lights L on the corresponding entrance surface 22 of the converging lens 20 may be determined such that the distance between the optical axis and the center of the entrance surface 22 increases as the distance between the center 12c of the emission surface forming area 12 and the corresponding emission surface 14 becomes longer. In other words, the distance between the entrance position of the optical axis of each of the emission lights L and a center 22c of the corresponding entrance surface 22 increases as the corresponding emission surface 14 shifts outward from the center 12c of the emission surface forming area 12. In this case, the position of the optical axis on the emission surface 14 located at the same distance from the center 12c of the emission surface forming area 12 is also located at the same distance from the center 22c of the corresponding entrance surface 22 of the converging lens 20. The position of the optical axis of the emission light L on the emission surface 14 positioned at the center 12c of the emission surface forming area 12 agrees with the center 22c of the corresponding entrance surface 22. Concerning the emission surface 14 shifted in a first direction A from the center 12c of the emission surface forming area 12, the position of the optical axis of the emission light L on the entrance surface 22 of the converging lens 20 may be shifted in the first direction A from the center 22c of the entrance surface 22 in the plan view with respect to the traveling direction of the emission light L (in the plan view of the entrance surface 22). Similarly, concerning the emission surface 14 shifted in a second direction B from the center 12c of the emission surface forming area 12, the position of the optical axis of the emission light L on the entrance surface 22 of the converging lens 20 may be shifted in the second direction B from the center 22c of the entrance surface 22 in the plan view with respect to the traveling direction of the emission light L. By supplying the emission lights L to the entrance surfaces 22 of the converging lenses 20 in this manner, deflection of the emission light L emitted from the emission surface 14 can increase as the distance between the emission surface 14 and the center 12c of the emission surface forming area 12 becomes longer. Thus, the emission lights L emitted from the plural emission surfaces 14 can be guided in such directions as to be stacked on the first fly-eye lens 50. That is, the illumination device 100 guides the emission lights L emitted from the plural emission surfaces 14 in such directions as to stack the emission lights L on the first fly-eye lens 50 by the function of the plural converging lenses 20, and individually converges and diverges the respective emission lights L. By this method, the emission lights L can be stacked on the first fly-eye lens 50. The plural converging lenses 20 can stack the emission lights L on the light entrance surface of the first fly-eye lens 50, for example.

Figure 3:
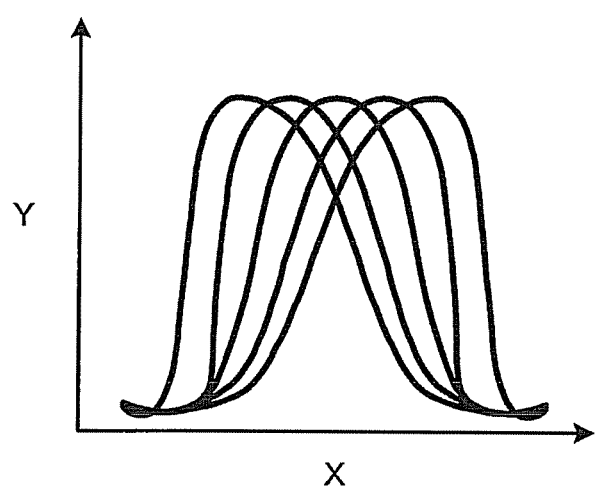
FIG. 3 shows intensity distribution of light entering a first fly-eye lens.

FIG. 3 shows intensity distribution of light entering the first fly-eye lens 50 (light reaching the entrance surface of the first fly-eye lens 50). The X axis indicates the position of the light entering the first fly-eye lens 50 within a plane perpendicular to the optical axis (the position on the light entrance surface of the first fly-eye lens 50). The Y axis indicates the intensity of the light. According to the intensity distribution of the light entering the first fly-eye lens 50, the peak position shifts and the distortion increases due to lens aberration as the distance between the center 22c of the entrance surface 22 of the converging lens 20 and the position of the optical axis of the emission light L becomes longer. Thus, the light intensity distribution of the lights stacked on the first fly-eye lens 50 can be equalized as shown in FIG. 3 when the entrance position of the optical axis of the emission light L on the entrance surface 22 of the converging lens 20 is determined such that the distance between the optical axis and the center 22c of the entrance surface 22 increases as the distance between the center 12c of the emission surface forming area 12 and the emission surface 14 becomes longer. By this method, light having uniform intensity distribution can be supplied to the first fly-eye lens 50.

Figure 4:
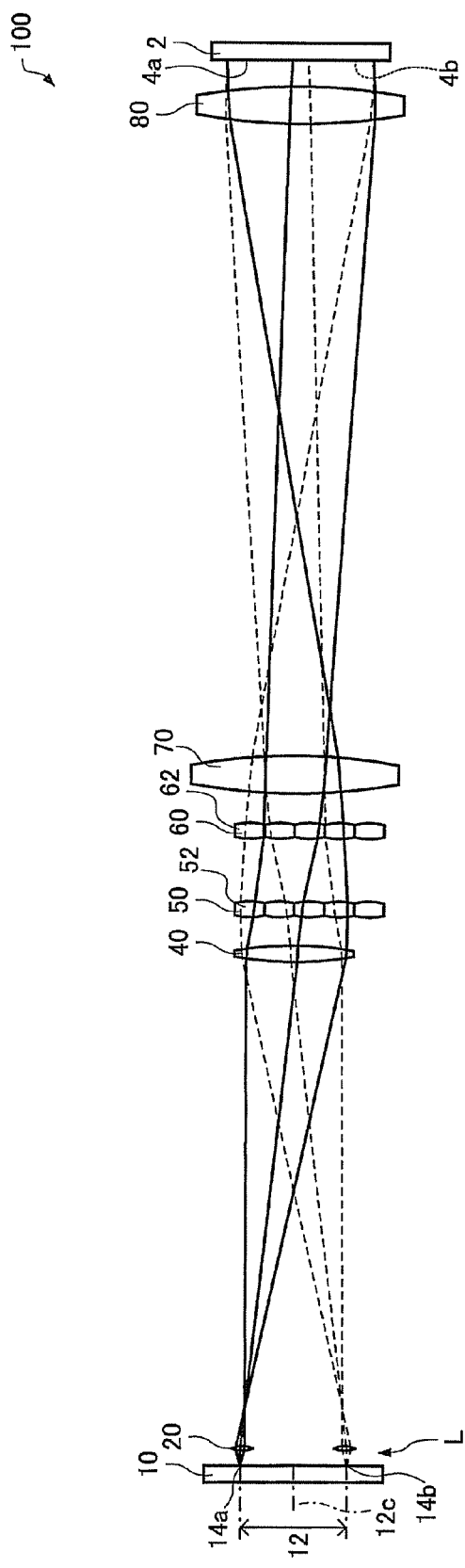
FIG. 4 schematically illustrates optical paths of lights emitted from emission surfaces.
Figure 5:
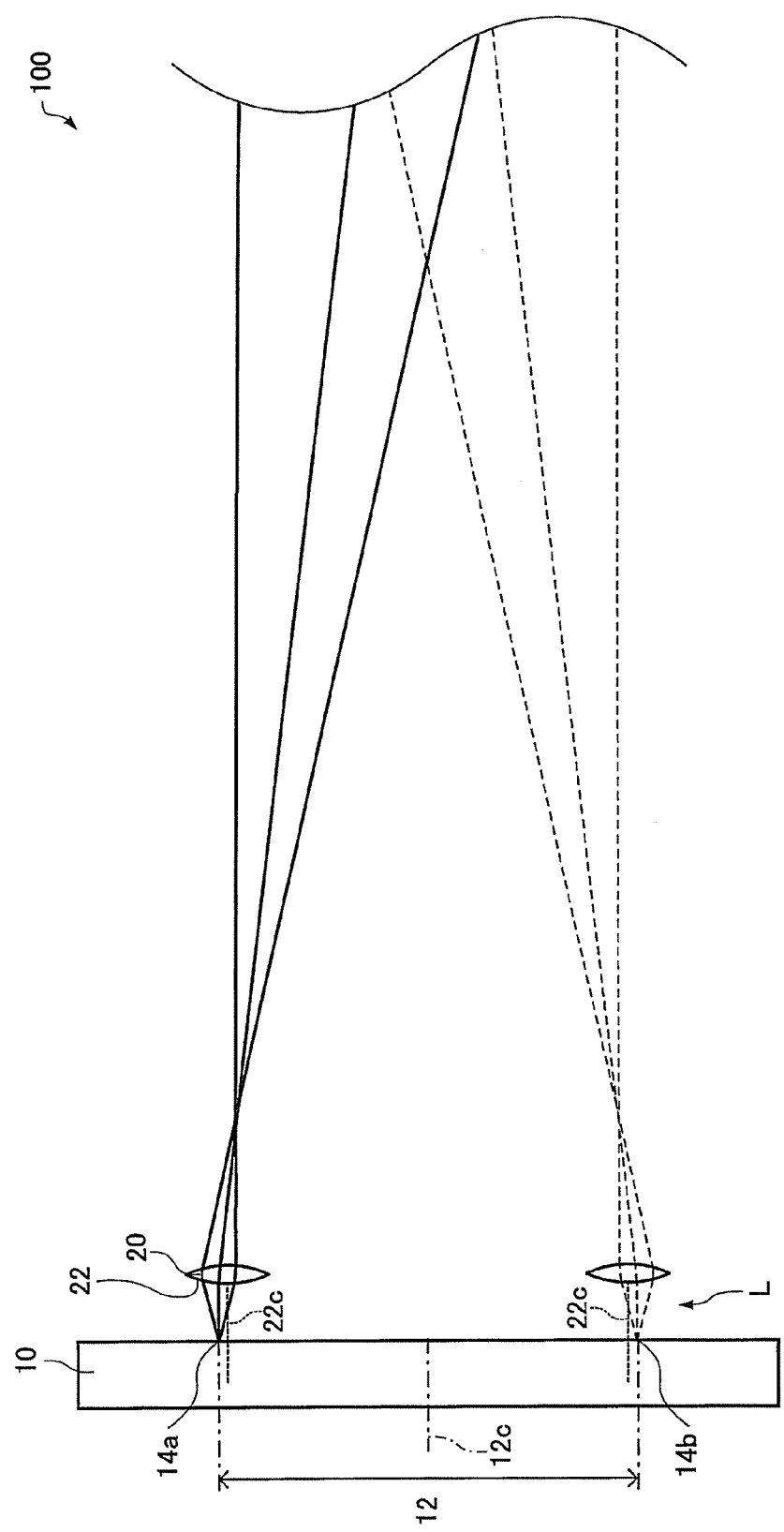
FIG. 5 schematically illustrates the optical paths of the lights emitted from the emission surfaces.

FIG. 4 schematically illustrates optical paths of lights emitted from the emission surfaces 14. FIG. 5 illustrates an enlarged part of the optical paths shown in FIG. 4. FIG. 4 shows optical paths of lights emitted from the two emission surfaces 14 (first emission surface 14a and second emission surface 14b). In FIGS. 4 and 5, solid lines indicate the optical path of the light emitted from the first emission surface 14a, and broken lines indicate the optical path of the light emitted from the second emission surface 14b. As illustrated in FIG. 4, the illumination device 100 can converge and diverge the emission lights L and supply the emission lights L to the first fly-eye lens 50 by the function of the converging lenses 20. In this case, the area on the first fly-eye lens 50 to which the emission lights L are supplied becomes wider than the area on the first fly-eye lens 50 to which the emission lights L are directly supplied. Thus, the size of each of illumination receiving areas 4a and 4b of light emitted from the one emission surface 14 can be almost equalized with the size of an illumination receiving area 4 of lights emitted from the plural emission surfaces 14 (see FIG. 1), for example. This applies to lights emitted from the emission surfaces other than the emission surfaces 14a and 14b shown in FIG. 4.

The first field lens 40 is an optical element which converges lights received from the converging lenses 20 on the first fly-eye lens 50. The first field lens 40 is disposed on the optical path between the converging lenses 20 and the first fly-eye lens 50. The first field lens 40 can supply a larger amount of light to the first fly-eye lens 50. Thus, the efficiency of using light can improve.

The first fly-eye lens 50 is an optical element which divides lights stacked by the plural converging lens 20 into plural partial lights. More specifically, lights stacked by the plural converging lenses 20 can be divided into plural partial lights and supplied to the second fly-eye lens 60 by the function of the first fly-eye lens 50. The first fly-eye lens 50 contains a plurality of element lenses 52 disposed in matrix and divides the lights stacked by the plural converging lenses 20 into plural partial lights by using the element lenses 52. The plural element lenses 52 are disposed within a plane crossing the optical axis at right angles, for example. Each contour shape of the element lenses 52 is similar to the shape of the illumination receiving area 4 (the light entrance surface 4 of the light valve 2 in the example shown in the figure), for example.

The second fly-eye lens 60 is an optical element which individually converges the plural partial lights divided by the first fly-eye lens 50 on the condenser lens 70. By this method, the second fly-eye lens 60 can supply a larger amount of the plural partial lights to the condenser lens 70. Thus, the efficiency of using light can improve. Similarly to the first fly-eye lens 50, the second fly-eye lens 60 may contain a plurality of element lenses 62 disposed in matrix. The plural element lenses 62 of the second fly-eye lens 60 may be provided in correspondence with the element lenses 52 of the first fly-eye lens 50 with one-to-one correspondence. The number of the element lenses 62 of the second fly-eye lens 60 is equal to the number of the element lenses 52 of the first fly-eye lens 50. Since the second fly-eye lens 60 is provided for convergence, each contour shape of the element lenses 62 is not required to be similar to the shape of the illumination receiving area 4. By providing an integrator illumination system which includes the first fly-eye lens 50 and the second fly-eye lens 60, illumination light can be equalized.

The condenser lens 70 is an optical element which stacks the plural partial lights divided by the first fly-eye lens 50. That is, the plural partial lights divided by the first fly-eye lens 50 can be stacked on the light entrance surface 4 of the light valve 2, for example, by the function of the condenser lens 70. By this method, the intensity distribution of light entering the first fly-eye lens 50 can be equalized, and illuminance unevenness of illumination light on the light entrance surface 4 of the light valve 2 (illumination receiving area) can be reduced. The condenser lens 70 can be considered as a stacking lens which stacks the plural partial lights on the light entrance surface 4 of the light valve 2.

The second field lens 80 is an optical element which converges the light received from the condenser lens 70 on the light entrance surface 4 of the light valve 2, for example. The second field lens 80 can supply a larger amount of the light received from the condenser lens 70 on the light entrance surface 4 of the light valve 2. Thus, the efficiency of using light can improve. It is possible to eliminate the second field lens 80.

While the illumination device 100 applied to the illumination device of the projector has been discussed in this embodiment, the illumination device 100 is applicable to a display, an illumination equipment and the like. This applies to the following embodiments.

The illumination device 100 has the following characteristics, for example.

The illumination device 100 stacks the emission lights L emitted from the plural emission surfaces 14 on the first fly-eye lens 50 to supply thereto by the function of the converging lenses 20. By this method, the illumination device 100 can supply light having more uniform light intensity distribution to the first fly-eye lens 50 than a structure which does not include the converging lenses 20. Thus, illuminance unevenness of illumination light on the illumination receiving area 4 can be reduced.

According to the illumination device 100, the position of the optical axis of the emission light L on the entrance surface 22 of the converging lens 20 is disposed such that the distance between the optical axis and the center of the entrance surface 22 increases as the distance between the center 12c of the emission surface forming area 12 and the emission surface 14 becomes longer. By this arrangement, light having uniform light intensity distribution can be supplied to the first fly-eye lens 50. Thus, illuminance unevenness of illumination light on the illumination receiving area 4 can be reduced.

According to the illumination device 100, the emission lights L emitted from the plural emission surfaces 14 can be converged and diverged by the converging lenses 20 and supplied to the first fly-eye lens 50. Thus, the size of the illumination receiving area of light emitted from the one emission surface 14 can be almost equalized with the size of the illumination receiving area 4 of lights emitted from the plural emission surfaces 14. Accordingly, even when output of light emitted from a part of the plural emission surfaces is lowered or stopped, illuminance unevenness of illumination light is not produced on the illumination receiving area 4.

1.2 Modified Examples

Modified examples of the illumination device according to the first embodiment are now described. In the following explanation, only the different points from the illumination device 100 described above are touched upon. Thus, the same reference numbers are given to similar parts, and the same explanation is not repeated.

(1) First Modified Example

Figure 6:
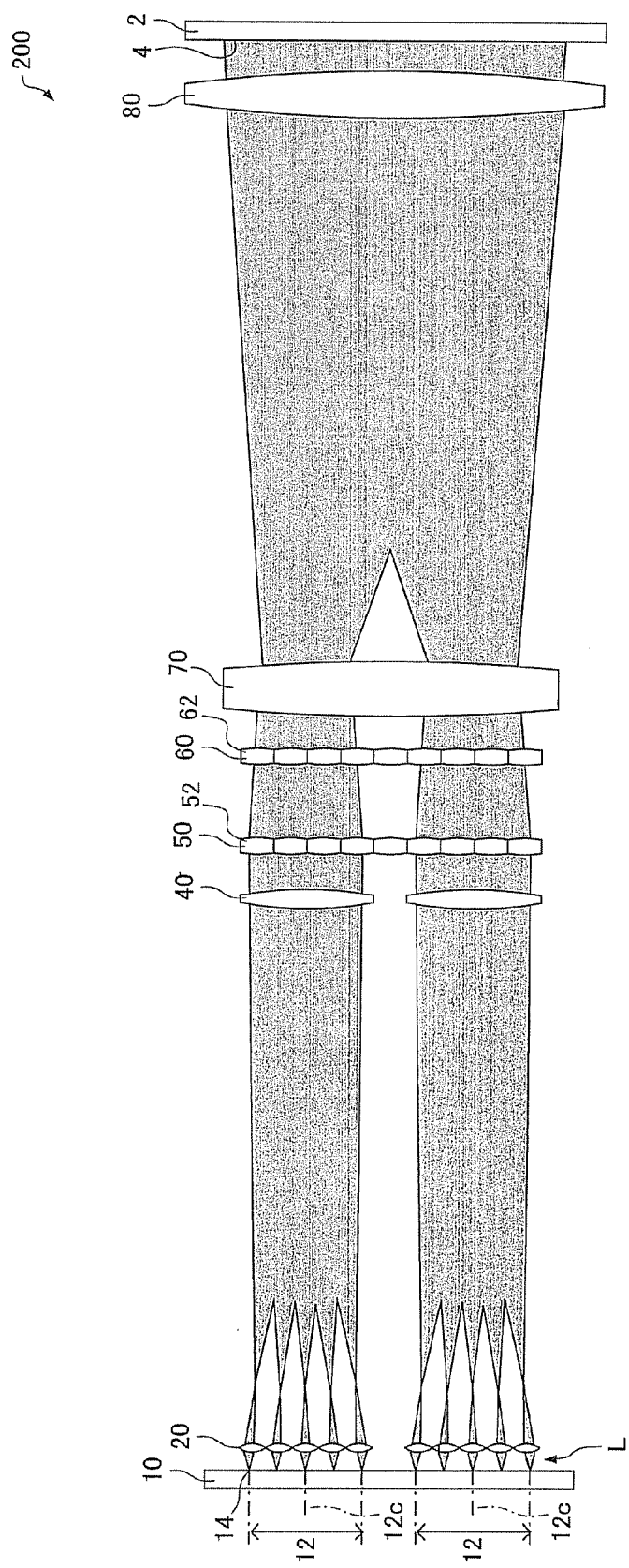
FIG. 6 schematically illustrates an illumination device according to a first modified example of the first embodiment.

An illumination device 200 according to a first modified example is initially described. FIG. 6 schematically illustrates the illumination device 200.

As can be seen from FIG. 6, the illumination device 200 may have the plural emission surface forming areas 12.

The light source 10 has the plural emission surface forming areas 12. According to the example shown in the figure, the two emission surface forming areas 12 are provided, but the number of the emission surface forming areas 12 is not specifically limited. For example, the emission surface forming areas 12 may have plural lines and plural rows, though not shown in the figure.

The plural converging lenses 20 can stack the emission lights L on the first fly-eye lens 50 for each of the emission surface forming areas 12. Thus, the radial angles of the lights released from the converging lenses 20 can be made smaller than those of a structure which does not stack the emission lights L for each of the emission surface forming areas 12, for example. That is, the incident angles of the lights entering the first fly-eye lens 50 can be made smaller than those of the structure which does not stack the emission lights L for each of the emission surface forming areas 12, for example. When the incident angles of lights entering the first fly-eye lens 50 are large, for example, the lights having reached the element lenses 52 of the first fly-eye lens 50 cannot enter the element lenses 62 of the second fly-eye lens 60 in some cases. As a result, the light transmissivity of the second fly-eye lens 60 lowers. However, the illumination device 200 decreases the incident angles of lights entering the first fly-eye lens 50, and thus can reduce lowering of the light transmissivity of the second fly-eye lens 60. The incident angle of the light L entering the first fly-eye lens 50 increases as the distance between the emission surface 14 from which the light L is emitted and the center 12c of the emission surface forming area 12 becomes longer. Thus, this modified example is particularly effective when the size of the light source 10 is large.

The number of the first field lens 40 may be plural in correspondence with the plural emission surface forming areas 12.

The first fly-eye lens 50 can individually divide the lights stacked by the converging lenses 20 for each of the emission surface forming areas 12 into plural partial lights. The plural partial lights divided by the first fly-eye lens 50 enter the condenser lens 70 via the second fly-eye lens 60.

The plural partial lights divided by the first fly-eye lens 50 can be stacked on the light entrance surface 4 of the light valve 2, for example, by the condenser lens 70. Moreover, the lights stacked on the first fly-eye lens 50 by the converging lenses 20 for each of the emission surface forming areas 12 can be stacked on the light entrance surface 4 of the light valve 2, for example, by the condenser lens 70.

According to the illumination device 200, the converging lenses 20 can diverge the emission lights L and supply the diverged lights L to the first fly-eye lens 50. Moreover, the condenser lens 70 can diverge the plural partial lights divided by the first fly-eye lens 50 and supply the diverged lights to the light entrance surface 4 of the light valve 2. Thus, the size of the illumination receiving area of the light emitted from the one emission surface 14 can be almost equalized with the size of the illumination receiving area of the lights emitted from the plural emission surfaces 14, for example.

According to the illumination device 200, the converging lenses 20 can stack the emission lights L on the first fly-eye lens 50 for each of the emission surface forming areas 12. In this case, the incident angles of the light entering the first fly-eye lens 50 can be decreased, and thus lowering of light transmissivity of the second fly-eye lens 60 can be reduced, for example. Accordingly, the efficiency of using light can improve.

(2) Second Modified Example

Figure 7:
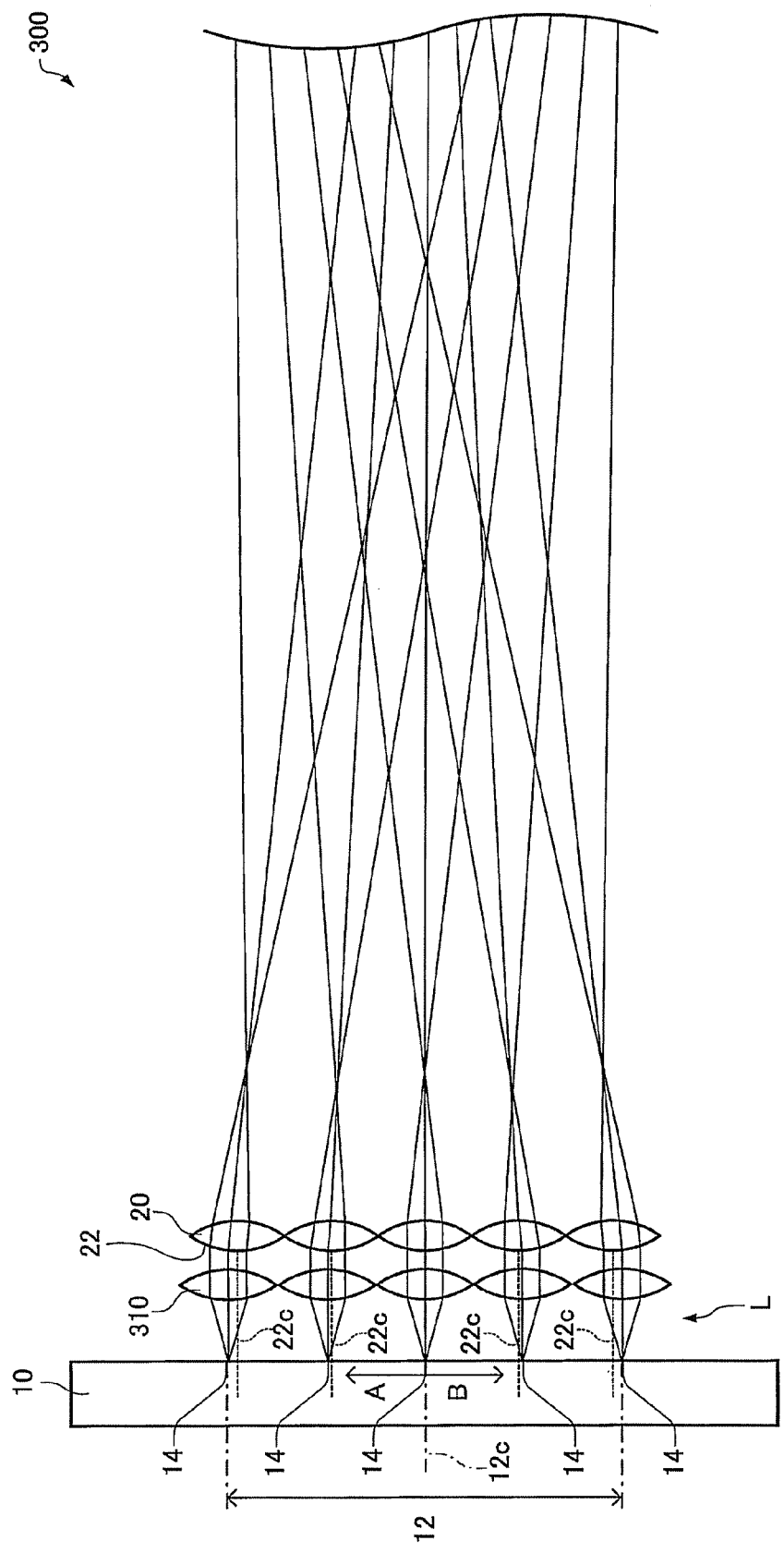
FIG. 7 schematically illustrates an illumination device according to a second modified example of the first embodiment.

An illumination device 300 according to a second modified example is now described. FIG. 7 schematically illustrates the illumination device 300. FIG. 7 corresponds to FIG. 2.

As can be seen from FIG. 7, the illumination device 300 may have collimating lenses 310 on the optical path between the light source 10 and the converging lenses 20.

The collimating lenses 310 are optical elements which convert the emission lights L into collimated lights. That is, the collimating lenses 310 convert the emission lights L into collimated lights and supply the collimated lights to the converging lenses 20. By this method, the efficiency of using light can improve. In addition, the degree of freedom in designing optical systems can increase.

The plural collimating lenses 310 are provided in correspondence with the plural emission surfaces 14. According to the example shown in the figure, the five collimating lenses 310 are equipped in correspondence with the five emission surfaces 14. Thus, the emission surfaces 14 and the collimating lenses 310 are disposed with one-to-one correspondence. The plural collimating lenses 310 may be formed integrally with each other. Accordingly, the plural collimating lenses 310 can be formed by a simple process.

According to this example, the illumination device 300 includes the collimating lenses 310 on the optical path between the light source 10 and the converging lenses 20. In this case, the emission lights L can be converted into collimated lights, and thus the efficiency of using light can increase. Moreover, the degree of freedom in designing optical systems can increase.

2. Second Embodiment

Figure 8:
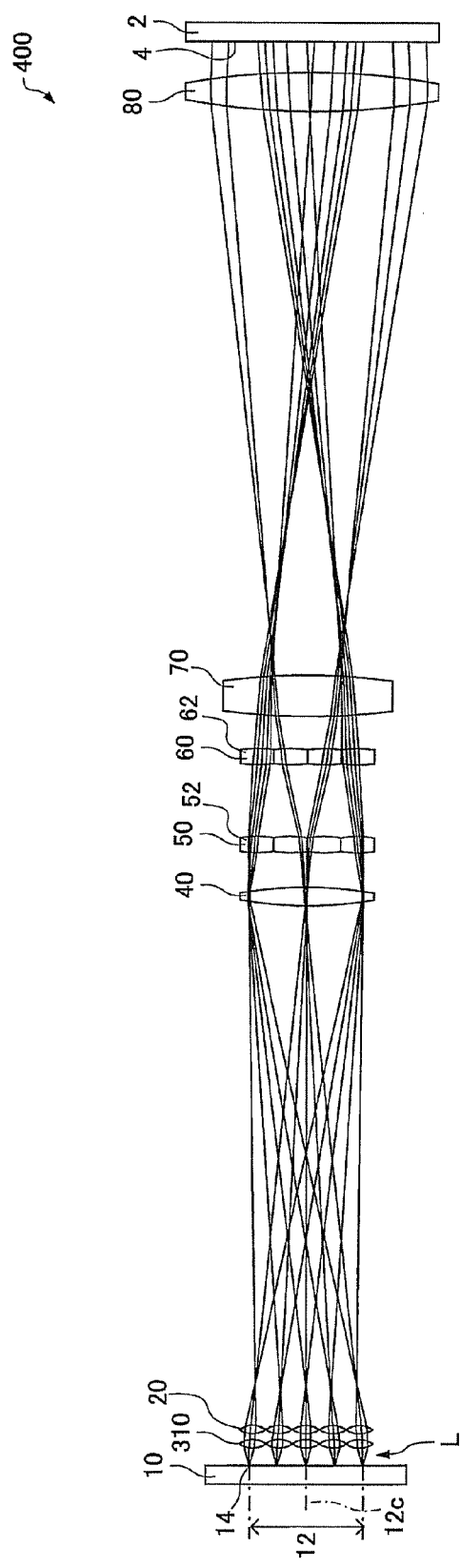
FIG. 8 schematically illustrates an illumination device according to a second embodiment.
Figure 9:
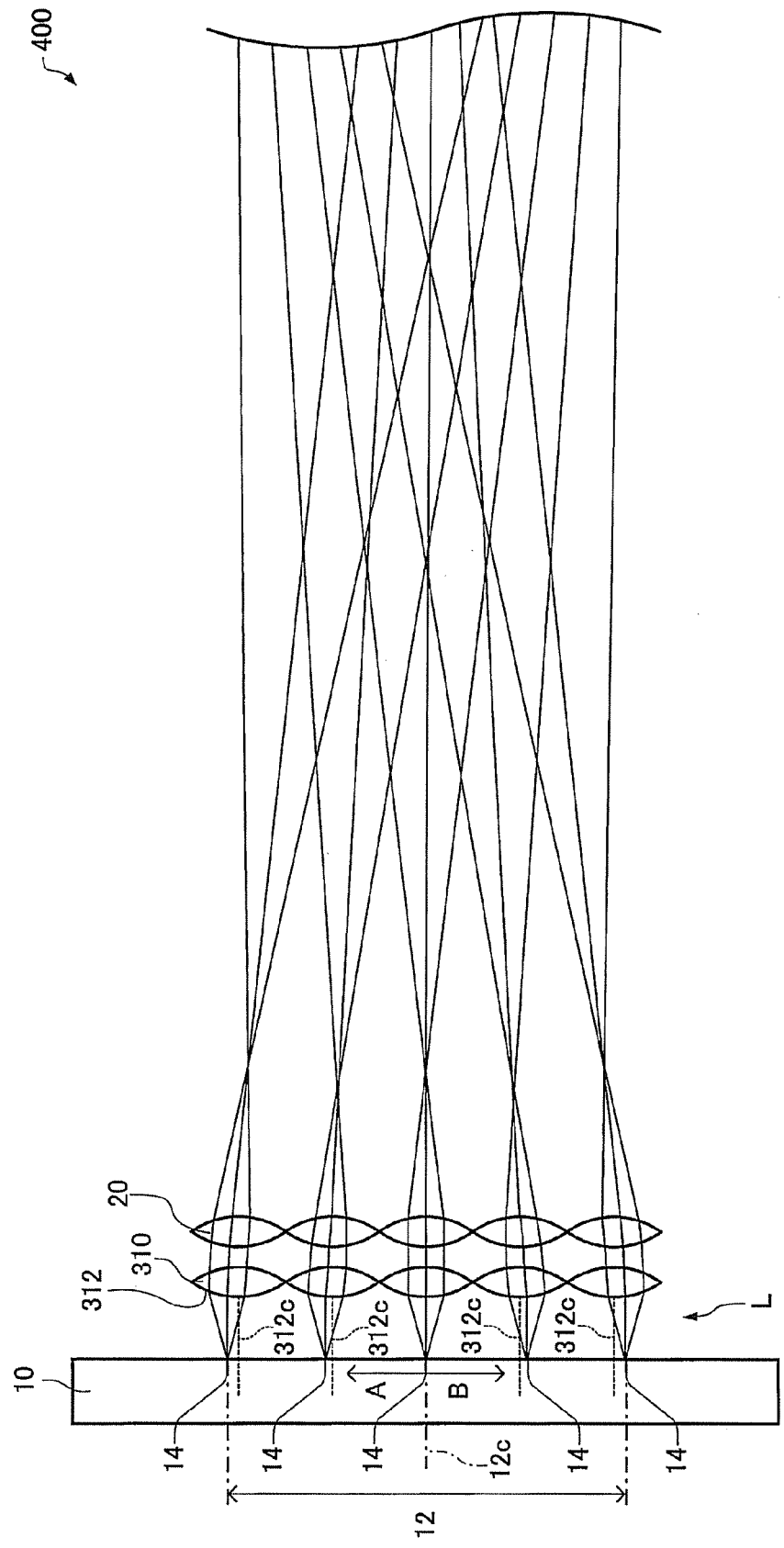
FIG. 9 schematically illustrates the illumination device according to the second embodiment.

An illumination device according to a second embodiment is now described. FIG. 8 schematically illustrates an illumination device 400 in the second embodiment. FIG. 9 is an enlarged part of the illumination device 400 shown in FIG. 8. In this embodiment, a projector including the illumination device 400 as an illumination device is discussed. In the illumination device 400 according to the second embodiment, the same reference numbers are given to components similar to those of the illumination devices 100, 200 and 300, and the detailed explanation of the similar components is not repeated.

As illustrated in FIG. 8, the illumination device 400 includes the light source 10, the collimating lenses 310, the converging lenses 20, the first fly-eye lens 50, the second fly-eye lens 60, and the condenser lens 70. The illumination device 400 may further include the first field lens 40 and the second field lens 80.

According to the illumination device 400, the emission lights L enter entrance surfaces 312 of the collimating lenses 310 as illustrated in FIG. 9. The position of the optical axis of the emission light L on each of the entrance surfaces 312 of the collimating lenses 310 may be determined such that the distance between the optical axis and the center of the entrance surface 312 increases as the distance between the center 12c of the emission surface forming area 12 and the emission surface 14 becomes longer. In other words, the distance between the entrance position of the optical axis of the emission light L and a center 312c of the entrance surface 312 increases as the emission surface 14 shifts outward from the center 12c of the emission surface forming area 12. In this case, the position of the optical axis on the emission surface 14 located at the same distance from the center 12c of the emission surface forming area 12 is also located at the same distance from the center 312c of the entrance surface 312. The position of the optical axis of the emission light L on the emission surface 14 positioned at the center 12c of the emission surface forming area 12 agrees with the center 312c of the corresponding entrance surface 312. Concerning the emission surface 14 shifted in the first direction A from the center 12c of the emission surface forming area 12, the position of the optical axis of the emission light L on the entrance surface 312 of the collimating lens 310 may be shifted in the first direction A from the center 312c of the entrance surface 312 in the plan view with respect to the traveling direction of the emission light L (in the plan view of the entrance surface 312). Similarly, concerning the emission surface 14 shifted in the second direction B from the center 12c of the emission surface forming area 12, the position of the optical axis of the emission light L on the entrance surface 312 of the collimating lens 310 may be shifted in the second direction B from the center 312c of the entrance surface 312 in the plan view with respect to the traveling direction of the emission light L. By supplying the emission lights L to the entrance surfaces 312 of the collimating lenses 310 in this manner, deflection of the emission light L emitted from the emission surface 14 becomes larger as the distance between the emission surface 14 and the center 12c of the emission surface forming area 12 increases. Thus, the emission lights L emitted from the plural emission surfaces 14 can be guided in such directions as to be stacked on the first fly-eye lens 50 (such as the light entrance surface of the first fly-eye lens 50).

According to the intensity distribution of the light entering the first fly-eye lens 50, the peak position shifts and the distortion increases due to lens aberration as the distance between the center 312c of the entrance surface 312 of the collimating lens 310 and the position of the optical axis of the emission light L becomes longer. Thus, the light intensity distribution can be equalized when the position of the optical axis of the emission light L on the entrance surface 312 of the collimating lens 310 is determined such that the distance between the optical axis and the center 312c of the entrance surface 312 increases as the distance between the center 12c of the emission surface forming area 12 and the emission surface 14 becomes longer. By this method, light having uniform intensity distribution can be supplied to the first fly-eye lens 50.

The plural converging lenses 20 are provided in correspondence with the plural collimating lenses 310. The collimating lenses 310 and the converging lenses 20 are disposed with one-to-one correspondence. Each of the converging lenses 20 is an optical element which converges light collimated by the collimating lens 310. More specifically, each of the converging lenses 20 is an optical element which converges (concentrates) the light collimated by the collimating lens 310, diverges the converged light, and supplies the diverged light onto the first fly-eye lens 50. In this case, the collimated light travels in the converging direction. Thus, the collimated light can be converged and diverged to be supplied and stacked on the first fly-eye lens 50 by the function of the converging lens 20. Accordingly, the emission lights L emitted from the plural emission surfaces 14 can be stacked on the first fly-eye lens 50 (such as the light entrance surface of the first fly-eye lens 50) by using the collimating lenses 310 and the converging lenses 20.

Figure 10:
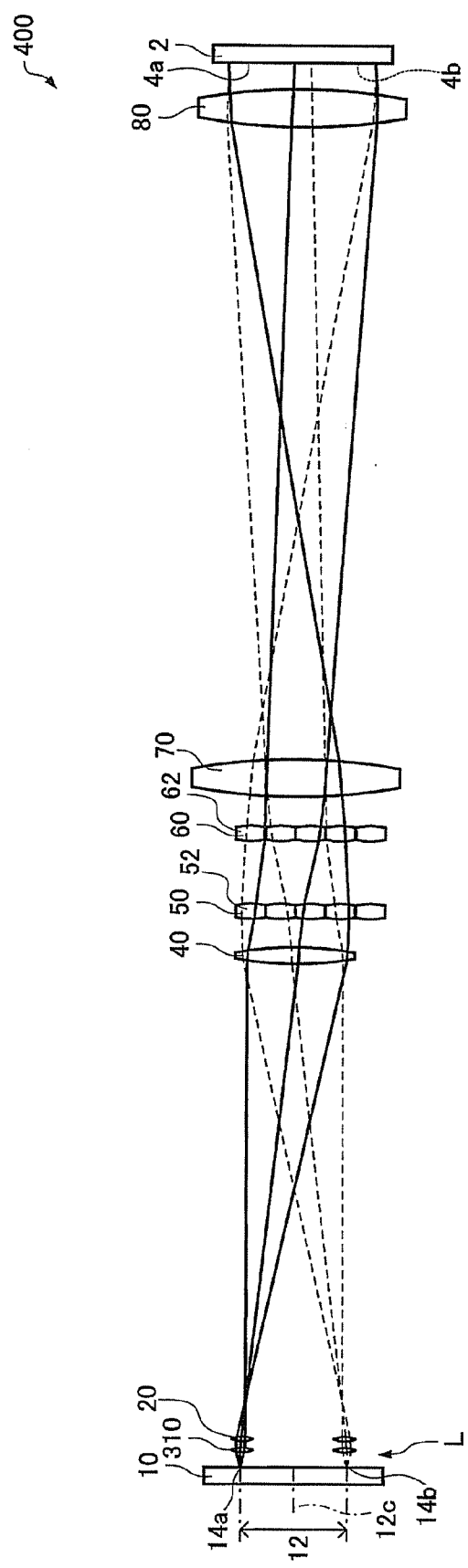
FIG. 10 schematically illustrates optical paths of lights emitted from emission surfaces.
Figure 11:
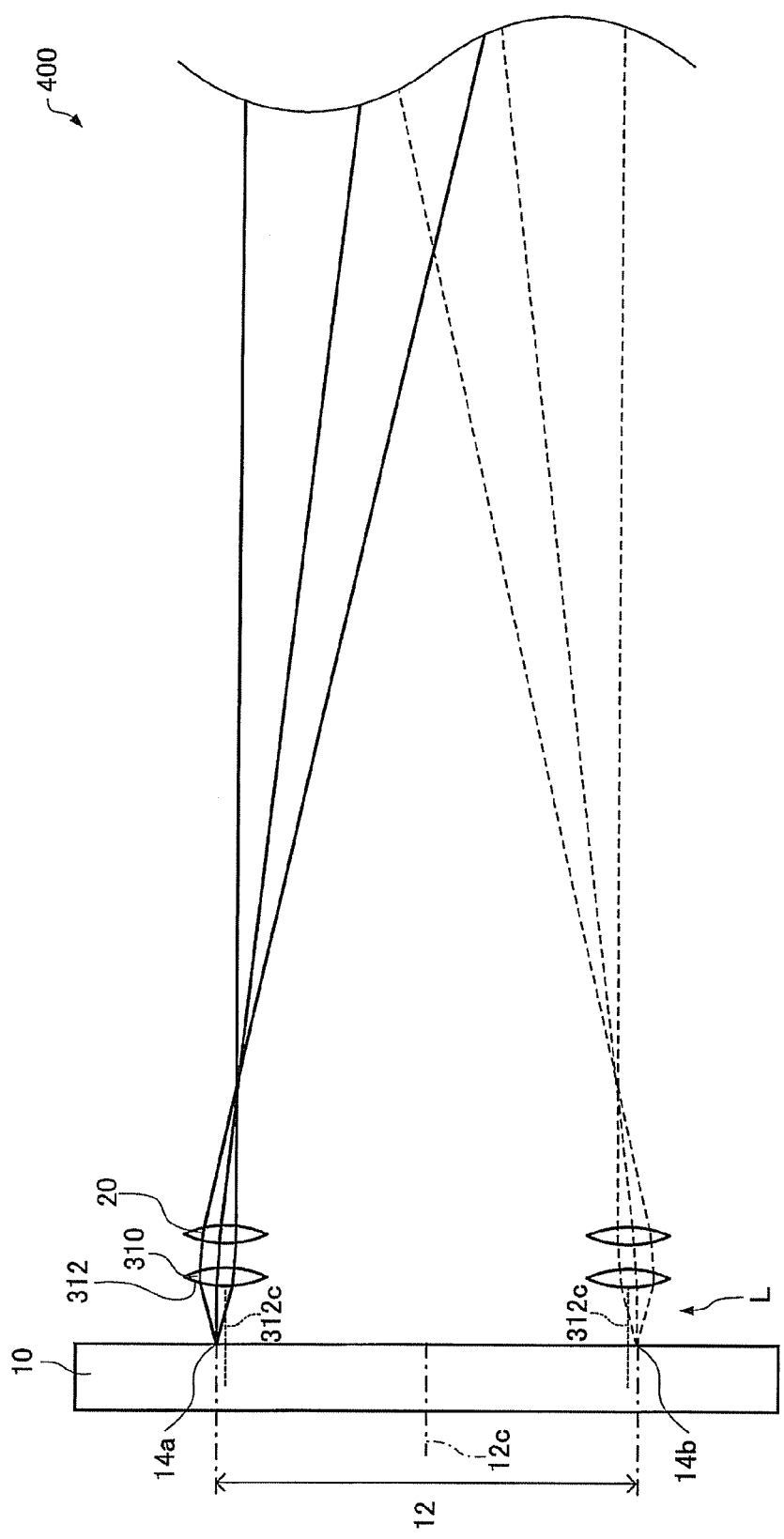
FIG. 11 schematically illustrates the optical paths of the lights emitted from the emission surfaces.

FIG. 10 schematically illustrates optical paths of lights emitted from the emission surfaces 14. FIG. 11 illustrates an enlarged part of the optical paths shown in FIG. 10. FIG. 10 shows the optical paths of lights emitted from the two emission surfaces 14 (the first emission surface 14a and the second emission surface 14b). In FIGS. 10 and 11, solid lines indicate the optical path of the light emitted from the first emission surface 14a, and broken lines show the optical path of the light emitted from the second emission surface 14b. As illustrated in FIG. 10, the illumination device 400 converges and diverges the lights received from the collimating lenses 310 and supplies the lights to the first fly-eye lens 50 by the function of the converging lenses 20. In this case, the area on the first fly-eye lens 50 to which the lights are supplied becomes wider than the area on the first fly-eye lens 50 to which the emission lights L are directly supplied. Thus, the size of each of illumination receiving areas 4a and 4b of light emitted from the one emission surface 14 can be almost equalized with the size of the illumination receiving area 4 of lights emitted from the plural emission surfaces 14 (see FIG. 8), for example. This applies to lights emitted from the emission surfaces other than the emission surfaces 14a and 14b shown in FIG. 10.

The illumination device 400 has the following characteristics.

According to the illumination device 400, the emission lights L emitted from the plural emission surfaces 14 can be supplied to and stacked on the first fly-eye lens 50 by the functions of the collimating lenses 310 and the converging lenses 20. In this case, the illumination device 400 can supply lights having more uniform light intensity distribution to the first fly-eye lens 50 than a structure not including the collimating lenses 310 or the converging lenses 20. Thus, illumination unevenness of illumination light on the illumination receiving area 4 can be reduced.

According to the illumination device 400, the position of the optical axis of the emission light L on the entrance surface 312 of the collimating lens 310 is disposed such that the distance between the optical axis and the center of the entrance surface 312 increases as the distance between the center 12c of the emission surface forming area 12 and the emission surface 14 becomes longer. By this arrangement, light having uniform light intensity distribution can be supplied to the first fly-eye lens 50. Thus, illuminance unevenness of illumination light on the illumination receiving area 4 can be reduced.

The illumination device 400 can converge and diverge the emission lights L emitted from the plural emission surfaces 14 and supply the emission lights L to the first fly-eye lens 50 by the function of the converging lenses 20. Thus, the size of the illumination receiving area of light emitted from the one emission surface 14 can be almost equalized with the size of the illumination receiving area 4 of lights emitted from the plural emission surfaces 14. Accordingly, even when output of light emitted from a part of the plural emission surfaces 14 is lowered or stopped, illuminance unevenness of illumination light is not produced on the illumination receiving area 4.

3. Third Embodiment

Figure 12:
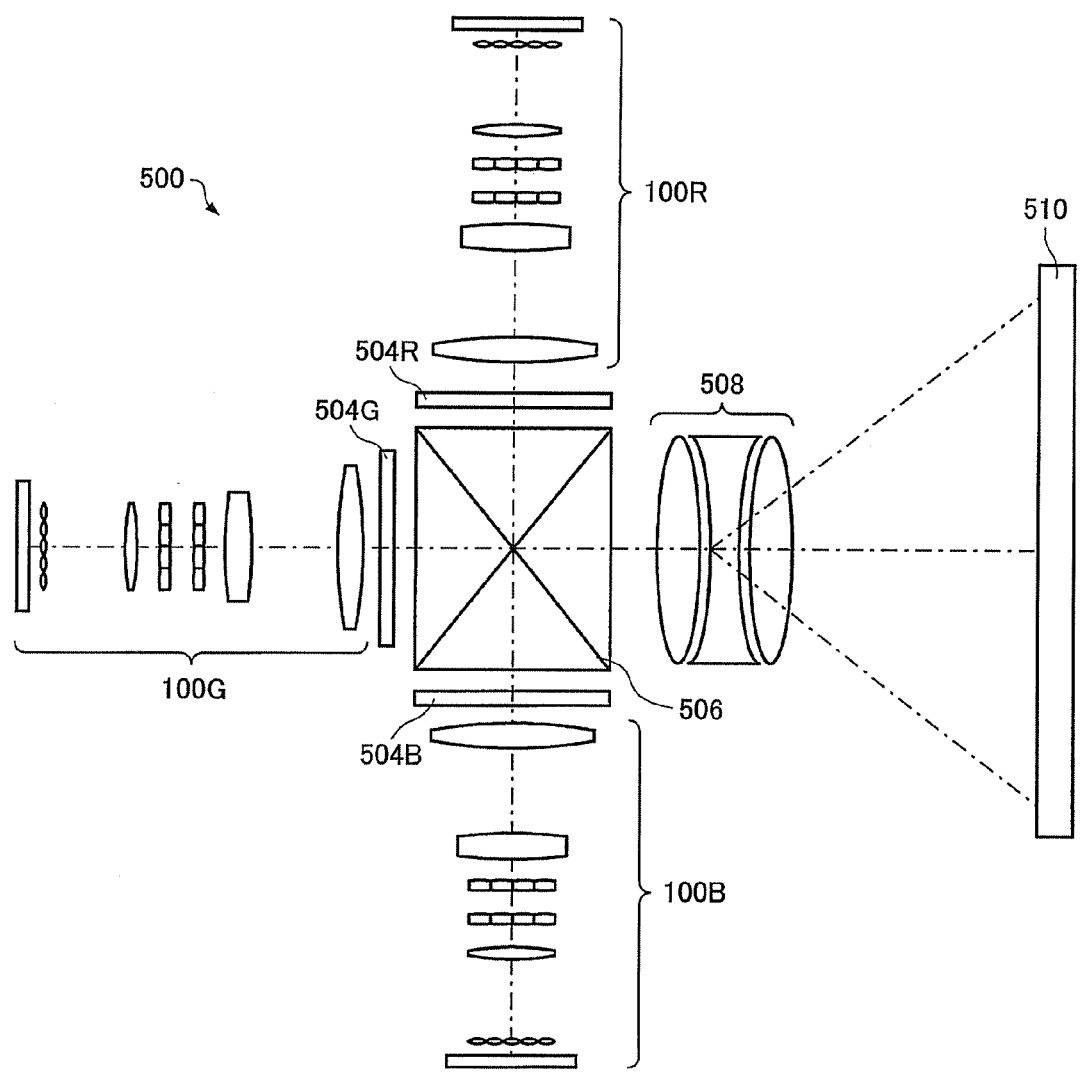
FIG. 12 schematically illustrates a projector according to a third embodiment.

A projector 500 according to a third embodiment is now described. FIG. 12 schematically illustrates the projector 500. FIG. 12 does not show a housing of the projector 500 for easy understanding of the figure. The projector 500 includes the illumination devices according to the embodiments of the invention. In this embodiment, the projector 500 contains the illumination devices 100 as the illumination devices according to the embodiments of the invention.

Each of an illumination device 100R for red light, an illumination device 100G for green light, and an illumination device 100B for blue light included in the projector 500 is constituted by the illumination device 100 described above.

The projector 500 includes transmission-type liquid crystal light valves (light modulation devices) 504R, 504G, and 504B for modulating lights emitted from illumination devices 100R, 100G, and 100B according to image information, and a projection lens (projection device) 508 for expanding images formed by the liquid crystal light valves 504R, 504G, and 504B and projecting the expanded images on a screen (display surface) 510. The projector 500 may further include a cross dichroic prism (color combining unit) 506 for combining the lights received from the liquid crystal light valves 504R, 504G, and 504B and guiding the combined light to the projection lens 508.

The three color lights modulated by the respective liquid crystal light valves 504R, 504G, and 504B enter the cross dichroic prism 506. This prism is produced by affixing four rectangular prisms, and contains a dielectric multilayer film for reflecting red light and a dielectric multilayer film for reflecting blue light disposed in a cross shape on the inner surfaces of the prisms. The three color lights are combined by these dielectric multilayer films and formed into light displaying a color image. The combined light is projected on the screen 510 by using the projection lens 508 as the projection system to display an expanded image.

While the transmission-type liquid crystal light valves are used as the light modulation devices in this embodiment, the light modulation devices may be light valves of types other than the liquid crystal type, or reflection-type light valves. Examples of these light valves involve reflection-type liquid crystal light valves and digital micromirror devices. The structure of the projection system is changed according to the types of light valves.

The illumination device 100 can be applied to an illumination device included in a scanning-type image display apparatus (projector) which has a scanning unit as an image forming device for displaying images of a desired size on a display surface by using light emitted from the illumination device 100 for scanning on a screen.

Since the projector 500 is provided with the illumination devices which can reduce illuminance unevenness, the projector 500 can project images having less illuminance unevenness.

The invention is not limited to the embodiments and modified examples described herein. For example, the embodiments and modified examples may be combined in appropriate manners.

While the embodiments according to the invention have been described in detail, it is easily understood by those skilled in the art that various modifications can be made substantially without departing from novel matters and advantages of the invention. It is therefore intended that these modifications are all included in the scope of the invention.

The entire disclosure of Japanese Patent Application No. 2009-261731, filed Nov. 17, 2009 is expressly incorporated by reference herein.

What is claimed is:

1. An illumination device comprising:
a light source which has an emission surface forming area where a plurality of emission surfaces are disposed;
a plurality of converging lenses disposed in a one-to-one correspondence with the plural emission surfaces to converge emission lights emitted from the emission surfaces;
a first fly-eye lens which divides lights converged by the plural converging lenses into a plurality of partial lights;
a second fly-eye lens which converges the plural partial lights;
a condenser lens which stacks the plural partial lights converged by the second fly-eye lens on an illumination receiving area; and
a plurality of collimating lenses disposed in correspondence with the plural emission surfaces to convert the emission lights into collimated lights, the plurality of collimating lenses being located on an optical path between the light source and the converging lenses,
wherein the plural converging lenses stack the emission lights on the first fly-eye lens,
a width of an array of the converging lenses in a direction of the array of the converging lenses is less than a width of an array of the collimating lenses in a direction of the array of the collimating lenses,
the emission lights enter entrance surfaces of the converging lenses,
the position of the optical axis of each of the emission lights on the entrance surfaces is determined such that the distance between the optical axis and the center of the corresponding entrance surface increases as the distance between the center of the emission surface forming area and the corresponding emission surface becomes longer, and
concerning the emission surface shifted from the center of the emission surface forming area in a predetermined direction, the position of the optical axis of the emission light emitted from the corresponding emission surface on the entrance surface is shifted from the center of the entrance surface in the predetermined direction.

2. The illumination device according to claim 1, wherein the number of the emission surface forming area is plural; and
the plural converging lenses stack the emission lights on the first fly-eye lens for each of the emission surface forming areas.

3. The illumination device according to claim 1, further comprising a field lens disposed on an optical path between the converging lenses and the first fly-eye lens to converge lights received from the converging lenses.

4. The illumination device according to claim 1, wherein the plural converging lenses are formed integrally with each other.

5. The illumination device according to claim 1, wherein the light source is a semiconductor laser, a super luminescent diode, or a light emitting diode.

6. A projector comprising:
the illumination device according to claim 1;
a light modulation device which modulates light received from the illumination device according to image information; and
a projection device which projects an image formed by the light modulation device.

* * * * *